United States Patent Office 3,268,400
Patented August 23, 1966

3,268,400
DIHYDROPHTHALIMIDOMETHYL ESTERS OF CYCLOPROPANE CARBOXYLIC ACID ESTERS AND INSECTICIDAL COMPOSITIONS THEREOF
Takeaki Kato and Kenzo Ueda, Nishinomiya-shi, Sadao Horie, Fuse-shi, Toshio Mizutani, Amagasaki-shi, Keimei Fujimoto, Minoo-shi, and Yositosi Okuno, Nishinomiya-shi, Japan, assignors to Sumitomo Chemical Company, Ltd., Higashi-ku, Osaka, Japan, a corporation of Japan
No Drawing. Filed July 10, 1964, Ser. No. 381,907
Claims priority, application Japan, Aug. 15, 1963, 38/43,227; Aug. 30, 1963, 38/46,168; Dec. 17, 1963, 38/68,215; Dec. 19, 1963, 38/68,673
10 Claims. (Cl. 167—33)

This invention relates to novel cyclopropanecarboxylic acid esters, to a process for preparing the same, and to insecticidal compositions continining the same. More particularly, it relates to novel cyclopropanecarboxylic acid esters having the general formula:

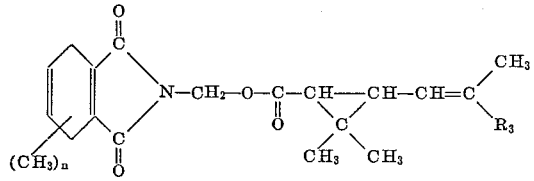

wherein R is a member selected from methyl and methoxycarbonyl radicals and $n$ is an integer of 0 to 2; to a process for preparing the same; and to insecticidal compositions containing the same.

It is one object of the invention to provide a novel group of cyclopropanecarboxylic acid esters, particularly of chrysanthemum carboxylic acid esters, which have strong insecticidal activities to house and agricultural insects with low toxicities to warm-blooded animals and plants, and which can be commercially produced in low cost. Another object is to provide a process for preparing such novel esters by a commercially available procedure. Still another object is to provide insecticidal compositions containing such an ester. Other objects would be obvious from the following description.

As an insecticide utilizable with safety because of the harmlessness to warm-blooded animals, pyrethrum extract has long been employed. Recently, allethrin which is an analog of the effective ingredients in pyrethrum extract, i.e. pyrethrin and cinerin, was synthesized and developed for insecticidal uses. These ingredients are surely valuable in their high insecticidal powers, especially in their rapid effect to insects, and in the characteristics of permitting no, or little, resistivity to insects. However, their uses are limited to some extent because of their complicated steps of the production and their great expenses for the production.

The present inventors have made broad researches on the various cyclopropanecarboxylic acid esters, and have now found the present novel group of cyclopropanecarboxylic acid esters, which possess significant insecticidal power but are harmless to warm-blooded animals, and which can be prepared from easily available materials by a simple process with low prices. In other words, the present compounds are dihydrophthalimidomethyl esters of chrysanthemum carboxylic acids. Accordingly, it is a feature of the present invention that the characteristics of the present compounds resemble to pyrethrin, cinerin and allethrin, even though the alcohol moieties of the former are extremely simple as compared to those of the latter and are composed of carbon, hydrogen, oxygen, and nitrogen atoms, unlike the latter composed of carbon, hydrogen and oxygen.

Thus, the present invention is to provide novel cyclopropanecarboxylic acid esters having the formula,

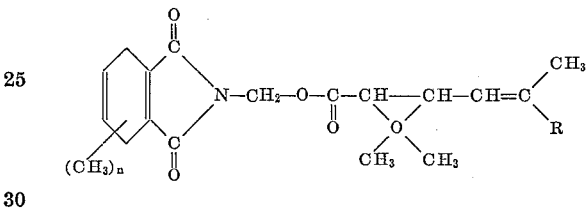

wherein R and $n$ have the same meanings as identified above, and to provide a process for preparing such compounds, comprising esterifying a dihydrophthalimide compound having the general formula,

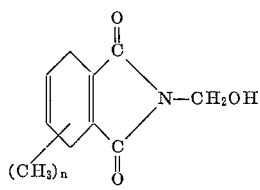

wherein $n$ has the same meaning as identified above, with a cyclopropanecarboxylic acid having the general formula,

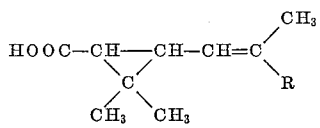

wherein R has the same meaning as identified above, according to the general esterifying procedure.

The dihydrophthalimide compounds employed in the present invention, in other words, N-(hydroxymethyl)-

3,6-dihydrophthalimides may be prepared from dihydro-phthalic acid, its anhydride, its imide compound, or their nucleus-substituted compounds, according to the conventional procedures well-known to those skilled in the art. For instance, N-(hydroxymethyl)-3,6-dihydrophthalimide may be prepared by reaction of 3,6-dihydrophthalimide with formaldehyde or its low molecular weight polymer according to the conventional methylolation conditions in the presence or absence of an alkaline catalyst, such as sodium hydroxide and potassium carbonate, in a solvent, such as water, benzene, and toluene. Similarly, various N-(hydroxymethyl)-3,6-dihydrophthalimides, such as N-(hydroxymethyl)-3-methyl-3,6-dihydrophthalimide, N - (hydroxymethyl) - 4 - methyl-3,6 - dihydrophthalimide, N - (hydroxymethyl) - 3,6-dimethyl - 3,6 - dihydrophthalimide, N - (hydroxymethyl)-3,5-dimethyl-3,6-dihydrophthalimide and the like compounds, may be prepared.

The cyclopropanecarboxylic acid employed in the present invention is either chrysanthemic acid (chrysanthemum monocarboxylic acid; R being CH₃) or pyrethric acid (R being COOCH₃, a monomethyl ester of chrysanthemum dicarboxylic acid). They are the acidic moieties of pyrethrin, cinerin and allethrin, and can be synthesized according to the known method.

The esterification reaction of the present invention may be effected in various ways. The dihydrophthalimide compound may be heated with the cyclopropanecarboxylic acid in the presence of a strong acid, such as aromatic sulfonic acid and sulfuric acid, in an organic solvent capable of azeotropically boiling with water, thereby to remove the water formed in the esterification, out of the reaction system. It may also be heated with a lower alkyl ester of the cyclopropanecarboxylic acid in the presence of a basic catalyst, such as sodium, potassium, sodium alcoholate and potassium alcoholate, thereby to continuously remove the lower alcohol formed through the ester-exchanging reaction out of the reaction system. In such case, methyl, ethyl, n-propyl and isopropyl ester are suitable. In the most preferable esterification, it may be treated with the cyclopropanecarboxylic acid halide in an inert organic solvent, preferably in the presence of a de-hydrogen halide agent, such as pyridine, triethylamine and other tertiary amine whereby the esterification is proceeded with the isolation of a hydrohalic acid salt within a short period of time. In this case, the acid chloride is the most preferable, though the bromide and the iodide may be employable. Further, it may be refluxed with the cyclopropanecarboxylic acid anhydride in an inert solvent for several hours, thereby to yield the objective ester and free cyclopropanecarboxylic acid, the latter being recovered and again converted to the anhydride by treatment with, for example acetic anhydride for reuse. Alternatively, the dihydrophthalimide compound may be employed for the esterification by once converting to the form of the halide having the general formula,

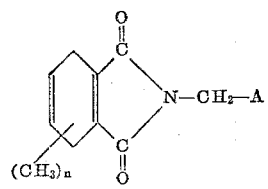

wherein $n$ has the same meaning as identified above, and A means a halogen atom, by treatment with thionyl chloride or phosphorus trichloride, etc. In this case, the halide may be heated with an alkali metal or ammonium salt of the cyclopropanecarboxylic acid in an inert solvent, thereby to yield the objective ester with the isolation of an alkali metal or ammonium halide salt. Alternatively, the halide may be heated with the free acid in an inert solvent in the presence of a dehydrogen halide agent, such as tertiary amines. In the formula, A may be any of chlorine, bromine, and iodine, among which the former two are preferable and practical. As the alkali metals, sodium and potassium are preferable.

As well-known, the cyclopropanecarboxylic acid as identified above comprises various stereoisomers and optical isomers. It is needless to say that the acid and the derivatives thereof as described herein involve their isomers.

The process of the invention is described in more detail with reference to the following examples, which are however to be construed for the purpose of illustration and not of the limitation.

*Examples*

*Method A.*—A mixture of 0.1 mol of an N-hydroxymethyl-3,6-dihydrophthalimide and 12 g. of dry pyridine was added with 70 ml. of dry toluene and the mixture was cooled with ice. A solution of 19.1 g. (0.102 mol) of cis- or trans-chrysanthemoyl chloride or 23.5 g. (0.102 mol) of pyrethroyl chloride in 70 ml. of dry toluene was dropped to the mixture while being stirred at a temperature below 40° C. The reaction proceeded exothermically, whereby pyridine-hydrochloric acid salt was isolated in the mixture. The reaction vessel was tightly closed and allowed to stand overnight. The excessive pyridine was neutralized with 5% hydrochloric acid, and the resulting two layers were separated from each other. The organic layer was washed with a saturated sodium bicarbonate solution and then with a saturated sodium chloride solution, and dried over sodium sulfate. The solution was purified by passing through an alumina column. Evaporation of the solvent in vacuo yielded a cyclopropanecarboxylic acid ester as a pale yellow liquid.

*Method B.*—A mixture of 0.1 mol of an N-(hydroxymethyl)-3,6-dihydrophthalimide, 32 g. of chrysanthemic acid anhydride and 60 g. of dry toluene was refluxed for 3 hours, and the reaction mass was washed with an aqueous sodium hydroxide solution at a temperature below 10° C., thereby to remove the by-produced chrysanthemic acid. The reaction mass was then washed with a saturated sodium chloride solution, thereby to remove the alkali, dried on sodium sulfate, and thereafter treated as described in the method A to obtain the objective product.

*Method C.*—A mixture of 0.1 mol of an N-(chloromethyl)-3,6-dihydrophthalimide and 21.2 g. (0.1 mol) of pyrethric acid were dissolved in 200 ml. of acetone, and 11.1 g. (0.11 mol) of triethylamine was dropped into the solution at room temperature while being stirred. Thereafter, the mixture was refluxed for 2 hours. The reaction mixture was cooled and filtered to remove the insoluble amine hydrochloride. The filtrate was evaporated in vacuo to remove the solvent, and the residue was dissolved in dry toluene. The solution was washed with water and dried over sodium sulfate, and thereafter treated as described in the method A to obtain the objective product.

Examples conducted according to the general methods as mentioned above are shown in the following Tables I and II.

TABLE I

| Example No. | N-(hydroxymethyl)-3,6-dihydrophthalimide utilized | Method of esterification | Chrysanthemic acid ester obtained ||||||||
|---|---|---|---|---|---|---|---|---|---|---|
| | | | Formula | Property | Yield, percent | Calcd. ||| Found |||
| | | | | | | C | H | N | C | H | N |
| 1 | (structure with CO-NCH$_2$OH-CO) | A[1] | $C_{19}H_{23}NO_4$ | M.P., 101–105° C | 97 | 69.28 | 7.04 | 4.25 | 69.19 | 7.03 | 4.23 |
| 2 | (structure with CH$_3$, CO-NCH$_2$OH-CO) | B[2] | $C_{20}H_{25}NO_4$ | $n_D^{25}$, 1.5190 | 94 | 69.95 | 7.33 | 4.08 | 69.99 | 7.32 | 4.00 |
| 3 | (structure with CH$_3$, CO-NCH$_2$OH-CO, CH$_3$) | A[3] | $C_{21}H_{27}NO_4$ | $n_D^{25}$, 1.5250 | 96 | 70.56 | 7.61 | 3.92 | 70.48 | 7.71 | 3.90 |
| 4 | (structure with H$_3$C, CO-NCH$_2$OH-CO) | A[3] | $C_{20}H_{25}NO_4$ | $n_D^{25}$, 1.5200 | 94 | 69.95 | 7.33 | 4.08 | 70.01 | 7.21 | 4.07 |
| 5 | (structure with H$_3$C, CO-NCH$_2$OH-CO, CH$_3$) | B[2] | $C_{21}H_{27}NO_4$ | $n_D^{25}$, 1.5285 | 92 | 70.56 | 7.61 | 3.92 | 70.66 | 7.83 | 3.91 |

[1] Trans-chrysanthemic acid chloride was employed.
[2] A mixture of cis- and trans-chrysanthemic acid anhydrides was employed.
[3] A mixture of cis- and trans-chrysanthemic acid chlorides was employed.

TABLE II

| Example No. | N-(hydroxymethyl)-3,6-dihydrophthalimide utilized | Method of esterification | Pyrethric acid ester obtained |||||||
|---|---|---|---|---|---|---|---|---|---|
| | | | Formula | Yield, percent | Calcd. ||| Found |||
| | | | | | C | H | N | C | H | N |
| 6 | (structure with CO-NCH$_2$OH-CO) | A | $C_{20}H_{23}NO_6$ | 90.9 | 64.33 | 6.21 | 3.75 | 64.28 | 6.22 | 3.83 |
| 7 | (structure with CO-NCH$_2$OH-CO, CH$_3$) employed after chlorinated | C | $C_{21}H_{25}NO_6$ | 83.6 | 65.10 | 6.50 | 3.62 | 64.98 | 6.48 | 3.66 |

As mentioned above, the present esters possess superior insecticidal power, and exhibit rapid knock down and excellent killing effect to houseflies, mosquitoes, cockroaches, etc. Moreover, these esters are especially useful for sanitary and domestic purposes, because of their rapid effectiveness and harmlessness (for example, N-(chrysanthemoxymethyl)-3,6 - dihydrophthalimide shows oral toxicity to mice in $LD_{50}$ value of more than 800 mg./kg.). The present esters are suitably employed for the preparation of insecticidal compositions which have broad uses, correlatively with the low cost.

For the formulation of the insecticidal composition containing the present compound as the essential active ingredient, oil solution, emulsifiable concentrate, wettable powder, dust, aerosol, mosquito coil, bait and other preparations, may be formulated using the generally employed carriers, diluents or auxiliary agents, according to the method known to those skilled in the art in the cases of the formulation of pyrethrum extract and allethrin. If the compound is crystalline, it is preferably employed as a preliminary prepared solution in an organic solvent, such as acetone, xylene, methylnaphthalene, etc., depending upon the type of the formulation.

If desired, the present esters may be employed for the preparation of the insecticidal compositions in combination with other insecticidal component, such as pyrethroide, for example, pyrethrum extract and allethrin, organochlorine and organophosphorus compounds, synergistic agent for pyrethroide, for example, piperonyl butoxide, piperonyl sulfoxide, β-butoxy-β'-thiocyanodiethyl ether and the like. By combination with such other ingredient, the present insecticidal composition can be adapted to broader uses with more increased effect.

Concretely speaking, the present esters may be blended with at least one of pyrethrin, allethrin, O,O-dimethyl-O-(3-methyl-4-nitrophenyl) thiophosphate, malathion, diazinone, dimethoate, γ-BHC, and others, to yield a pesticidal composition which possesses high insecticidal activity with rapid effectivity. In such cases, the both components may be blended in a broad range of proportions, for example, in ratio of 0.05:1 to 1:0.05 by weight of the ester to another insecticidal component.

The present esters are comparatively stable. However, if the present esters are intended to be stored under a severe condition for a long period of time, they may preferably be added with a small amount of a stabilizer, for example, alkylphenol compounds such as those having the formula (1) 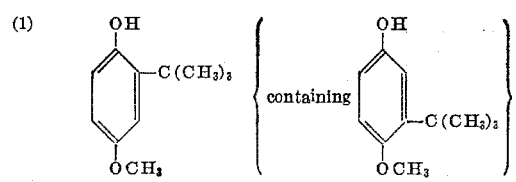

(2) 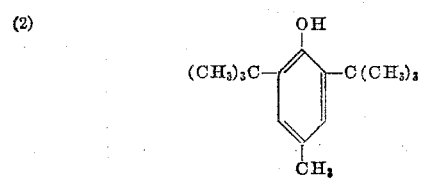

(3) 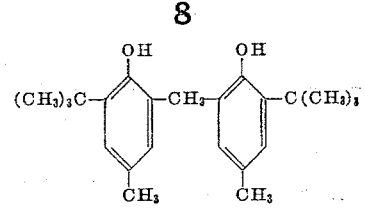

(4) 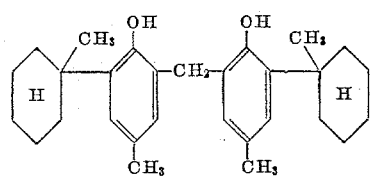

The amount of the stabilizer, if added, may be less than 1% by weight of the present ester, ordinarily from 1 to 0.1%.

The following are the illustrations of the insecticidal compositions containing the cyclopropanecarboxylic acid esters according to the invention and of the insecticidal activities.

*Example 8*

A solution of 0.3 g. of N-(chrysanthemoxymethyl)-3,6-dihydrophthalimide in 1 g. of xylene was diluted with a refined kerosene to make the volume 100 ml., whereby 0.3% oil preparation was obtained.

By metal turn-table method (Campbell, F. L., Sullivan, W. N., Soap and Sanit. Chemicals, vol. 14, No. 6, P-119, 1938), each 5 ml. of the 0.3% oil preparation or that diluted with a refined kerosene was sprayed to about 100 house flies (adult) within 10 seconds. After 20 seconds, the shutter was opened and the house flies were allowed to expose to the sprayed mist for 10 minutes. Then, the house flies were transferred to a cage, and the knockdown number was counted. After 24 hours, kill number was also observed.

Similarly a 0.3% oil preparation containing allethrin or that diluted with a refined kerosene was tested.

|  | Concentration the ingredient (percent) | Knock-down ratio (percent) (After 10 min.) | Mortalities (percent) |
|---|---|---|---|
| The present compound | 0.3 | 100 | 94.9 |
|  | 0.15 | 100 | 78.6 |
|  | 0.075 | 100 | 40.3 |
| Allethrin | 0.3 | 100 | 98.5 |
|  | 0.15 | 100 | 74.1 |
|  | 0.075 | 100 | 39.3 |

*Example 9*

A 100 ml. of refined kerosene solution containing 0.3 g. of N-(chrysanthemoxymethyl)-3-methyl-3,6-dihydrophthalimide was prepared.

In a glass box of 70 cm. cube, about 30 house flies (adult) were liberated, and 0.3 ml. of the thus-prepared 0.3% oil preparation was uniformly sprayed with an atomizer into the box. Knock-down number of the house flies according to the lapse of time were observed. Similarly, a 0.3% oil preparation containing allethrin was tested for comparison.

KNOCK-DOWN RATIO OF HOUSE FLIES ACCORDING TO THE LAPSE OF TIME (PERCENT)

|  | 30 sec. | 42 sec. | 1 min. | 1½ min. | 2 min. | 2⅔ min. | 4 min. | 5⅔ min. | 8 min. |
|---|---|---|---|---|---|---|---|---|---|
| The present compound | 2.4 | 5.8 | 10.4 | 19.6 | 37.6 | 54.4 | 61.3 | 68.2 | 79.5 |
| Allethrin | 4.3 | 6.9 | 11.9 | 26.4 | 43.3 | 55.7 | 62.9 | 73.8 | 80.2 |

Example 10

An emulsifiable concentrate was obtained by uniformly mixing 10 g. of N-(chrysanthemoxymethyl)-4-methyl-3,6-dihydrophthalimide, 80 g. of xylene and 10 g. of Sorpol SM-200 (a surface active agent, trade name of Toho Chemical Co., Ltd.).

The resulting 10% emulsifiable concentrate was diluted with water, and each 10 ml. was sprayed onto house flies (adult) in a settling-tower (S. E. A. McCallan, R. H. Wellman, Contributions of Boyce Thompson, Inst., vol. 12, p. 451, 1942) within 10 seconds. After 5 seconds, the shutter was opened and the house flies were exposed to the sprayed mist for 10 minutes and then taken out from the settling tower. The house flies were kept at a constant temperature of 28° C. and the mortality was examined after 20 hours.

| Concentration of the ingredient (percent): | Mortality (percent) |
|---|---|
| 1.0 | 80.5 |
| 0.5 | 60.0 |
| 0.25 | 42.2 |
| 0.125 | 15.3 |

Example 11

In similar way as described in Example 8, 0.5% oil preparation containing N-(pyrethroxymethyl)-3,6-dihydrophthalimide was prepared and tested.

| | Percent |
|---|---|
| Concentration of the ingredient | 0.5 |
| Knock-down ratio (after 10 min.) | 100 |
| Mortality (after 24 hours) | 98.0 |

Example 12

In similar way as described in Example 8, 1.0% oil preparation containing N-(pyrethroxymethyl)-3-methyl-3,6-dihydrophthalimide was prepared and tested.

| | Percent |
|---|---|
| Concentration of the ingredient | 1.0 |
| Knock-down ratio (after 10 min.) | 100 |
| Mortality (after 24 hours) | 81.7 |

Example 13

In similar way as described in Example 8, 0.5% oil preparation containing N-(pyrethroxymethyl)-4-methyl-3,6-dihydrophthalimide was prepared and tested.

| | Percent |
|---|---|
| Concentration of the ingredient | 0.5 |
| Knock-down ratio (after 10 min.) | 100 |
| Mortality (after 24 hours) | 98.0 |

Example 14

In similar way as described in Example 10, 10% emulsifiable concentrate containing N-(pyrethroxymethyl)-3,6-dihydrophthalimide was obtained.

The resulting 10% emulsifiable concentrate was diluted in water of 20 times weight and the emulsion was sprayed to a favorite habitat of house flies in an amount of 50 ml./m.² . The emergence of house flies was prevented almost completely.

What we claim is:

1. A cyclopropanecarboxylic acid ester having the formula,

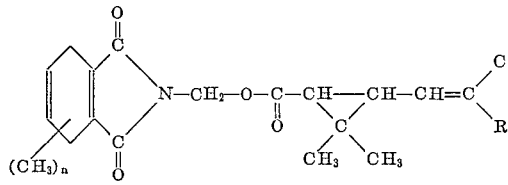

wherein R is a member selected from the group consisting of methyl and methoxycarbonyl, and $n$ is an integer of 0 to 2.

2. A compound selected from the group consisting of N-(chrysanthemoxymethyl)-3-methyl-3,6-dihydrophthalimide and N-(chrysanthemoxymethyl)-4-methyl-3,6-dihydrophthalimide.

3. A compound selected from the group consisting of N-(chrysanthemoxymethyl)-3,6-dimethyl-3,6-dihydrophthalimide and N-(chrysanthemoxymethyl)-3,5-dimethyl-3,6-dihydrophthalimide.

4. A compound selected from the group consisting of N-(pyrethroxymethyl)-3-methyl-3,6-dihydrophthalimide and N-(pyrethroxymethyl)-4-methyl-3,6-dihydrophthalimide.

5. N-(chrysanthemoxymethyl)-3,6-dihydrophthalimide.

6. N-(prethroxymethyl)-3,6-dihydrophthalimide.

7. A composition comprising a carrier and as the essential ingredient an insecticidal amount of a cyclopropanecarboxylic acid ester having the formula

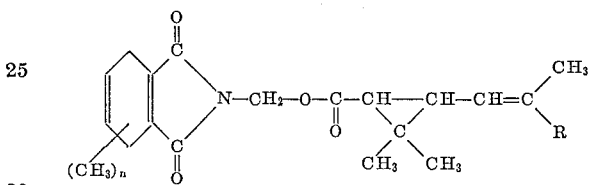

wherein R is a member selected from the group consisting of methyl and methoxycarbonyl, and $n$ is an integer of 0 to 2.

8. A composition comprising an organic solvent and as the essential ingredient an insecticidal amount of a cyclopropanecarboxylic acid ester having the formula

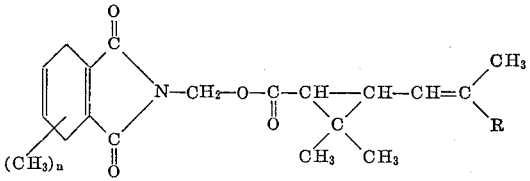

wherein R is a member selected from the group consisting of methyl and methoxycarbonyl, and $n$ is an integer of 0 to 2.

9. A composition comprising an emulsifier and as the essential ingredient an insecticidal amount of a cyclopropanecarboxylic acid ester having the formula

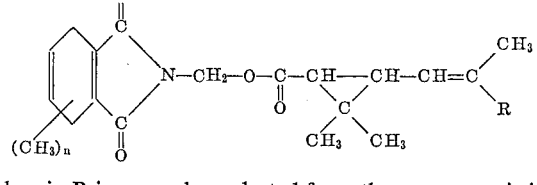

wherein R is a member selected from the group consisting of methyl and methoxycarbonyl, and $n$ is an integer of 0 to 2.

10. A composition comprising a powdered solid carrier and as the essential ingredient an insecticidal amount of a cyclopropanecarboxylic acid ester having the formula

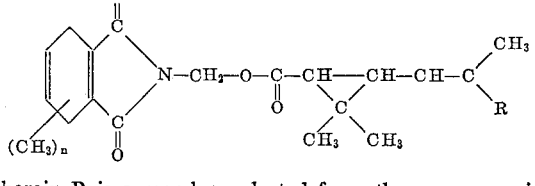

wherein R is a member selected from the group consisting of methyl and methoxycarbonyl, and $n$ is an integer of 0 to 2.

References Cited by the Examiner
UNITED STATES PATENTS

| | | | |
|---|---|---|---|
| 2,487,106 | 11/1948 | Cornwell | 260—326 |
| 2,872,450 | 2/1959 | Sasse et al. | 260—326 X |
| 2,914,530 | 11/1959 | Schrader et al. | 260—326 X |
| 3,152,138 | 10/1964 | Aichenegg et al. | 260—326 X |

OTHER REFERENCES
Cram et al., Organic Chemistry, McGraw-Hill Book Co., Inc., New York, 1959, pages 75 to 77.

Nefkens, Nature, vol. 193, 1962, pages 974–975.

ALEX MAZEL, *Primary Examiner.*

HENRY R. JILES, *Examiner.*

MARY U. O'BRIEN, *Assistant Examiner.*